W. WORTHINGTON.
METHOD OF MAKING COMPOSITE STEEL PLATES.
APPLICATION FILED OCT. 4, 1918.
1,351,824. Patented Sept. 7, 1920.
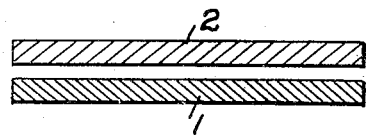
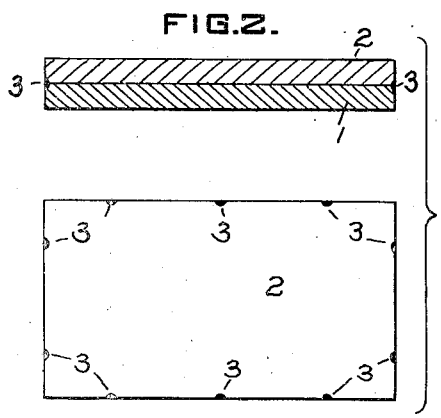
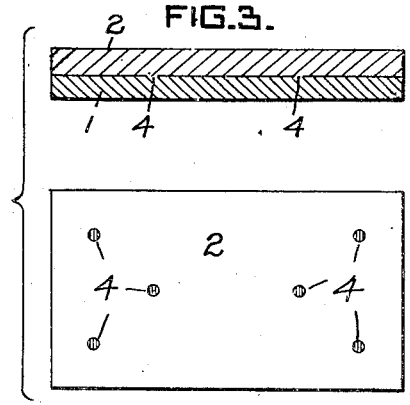
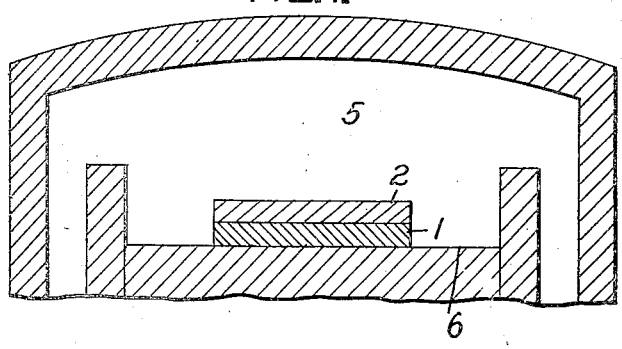
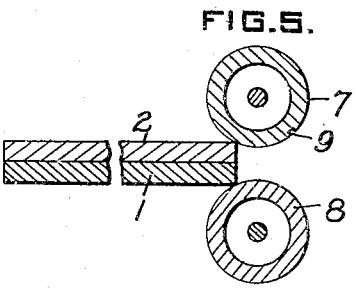
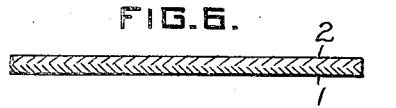
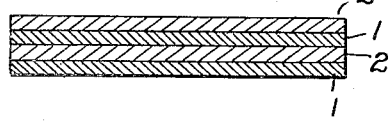
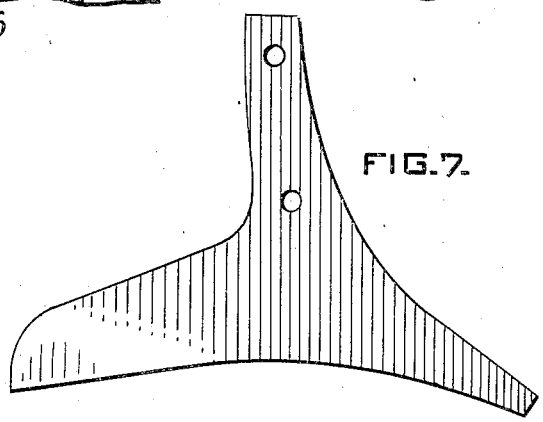
WITNESSES
J. Herbert Bradley.
INVENTOR
Warren Worthington,
By Fred'k W. Winter,
Attorney.

UNITED STATES PATENT OFFICE.

WARREN WORTHINGTON, OF BUFFALO, NEW YORK.

METHOD OF MAKING COMPOSITE STEEL PLATES.

1,351,824.   Specification of Letters Patent.   Patented Sept. 7, 1920.

Application filed October 4, 1918. Serial No. 256,805.

*To all whom it may concern:*

Be it known that I, WARREN WORTHINGTON, a resident of Buffalo, in the county of Erie and State of New York, have invented a new and useful Improvement in Methods of Making Composite Steel Plates, of which the following is a specification.

This invention relates to a method of making composite steel plates, and particularly composite steel plates suitable for plowshares, mold boards and shovel boards for plows, cultivators, etc., but it is not limited to this use.

Plow plates and the like must have a hard surface so that they will take a good polish and not wear out quickly, and at the same time must be tough so that they cannot be easily broken. When the steel is made hard enough to take a polish or resist wear it is generally brittle and breaks easily. When it is made tough so that it will not break easily, it is relatively soft and therefore wears out quickly and does not take a good polish. It is therefore desirable to provide a composite plate having a hard surface which will polish easily and resist wear and a tough body which will prevent the plate being broken.

One of the objects of the present invention is to provide an improved method for making composite steel plates in which a plate of high carbon steel, ordinarily not capable of being welded, is united to a plate of lower carbon steel to provide a composite integral structure having requisite qualities of surface hardness and body tenacity.

Other objects and advantages of the invention will hereinafter appear.

In the accompanying drawings, Figure 1 is a cross section of the two plates or slabs used to make the composite plate; Fig. 2 is a cross section and top plan view showing the plates or slabs held together at their edges by acetylene welding; Fig. 3 is a cross section and top plan view of the plates or slabs held together by an alternative method, namely, by spot welding; Fig. 4 illustrates the manner in which the united plates or slabs are placed in the heating furnace; Fig. 5 illustrates the uniting of the plates or slabs by means of ordinary rolls; Fig. 6 is a cross section of the composite steel plate; Fig. 7 illustrates the plate formed into a plowshare; and Fig. 8 is a sectional view showing a plate or slab having more than two layers of strata.

The composite plate is formed by uniting two steel plates or thin slabs 1 and 2 of approximately the same size and of any desired thickness, the plate or slab 1 being of high carbon steel and the plate or slab 2 of lower carbon steel. The plate or slab 1 preferably is at least sixty carbon steel, that is, it may contain six-tenths of one per cent. of carbon, but in some cases the carbon may run even higher. It is also high in manganese and, generally speaking, is very hard and not capable of being welded by ordinary processes, and while suitable for the surface of the composite plate is too hard and brittle for the body thereof.

The plate or slab 2 is composed of steel having such a percentage of carbon and other ingredients that it is tough and easily welded and therefore suitable for forming the body of the composite plate. These plates or slabs may be of the same thickness, or of different thicknesses, depending upon the uses to which they are put.

These two plates or slabs are united as follows:—

They are first thoroughly cleaned, such as by giving them an acid bath, which thoroughly frees their surface of all dirt, scale and the like, and are preferably firmly held together by some suitable means preparatory to welding. One method of holding them together is to unite their edges at various points by means of an oxy-acetylene torch, as illustrated at 3 in Fig. 2. Another method is to spot weld them at various points, as illustrated at 4 in Fig. 3, by applying an electric current locally by means of two welded terminals, thereby welding the plates together at various spots.

The plates or slabs are then placed in a heating furnace 5 in the manner illustrated in Fig. 4, with the plate or slab 1 of high carbon steel resting on the bottom or hearth 6 of the furnace so that it will be maintained relatively cool and so that the flames will not strike it directly. The composition of this plate or slab is such that if it were subjected directly to the flame in the furnace it would be burned and its structure would be destroyed before it would be brought to welding heat. By having it rest on the bottom of the furnace, the flames do not strike it directly and it is maintained relatively cool by reason of its position and by reason of the protection afforded by the plate 2 which is on top of it. Of course, the heat of the furnace brings the plate 1 to a high temperature, but by following the course above outlined this is accomplished without injury to the high carbon steel, as would be the case if the heat were applied directly.

After the plates or slabs have been brought to a welding heat, they are united by the application of pressure, such as by passing them through rolls 7 and 8 of ordinary form, until they are welded into a single integral composite plate or slab, and reduced to a plate of the desired thickness, and having a section such as illustrated in Fig. 6. One surface of this integral plate is composed of high carbon steel which is hard and which will take a high polish and the opposite side is composed of lower carbon steel which is tenacious. The plates are united so thoroughly that the completed plate has the appearance of an integral plate. In fact, it is integral and may be cut, shaped and worked into various forms in the same manner as in other steel plate.

The uniting of the plates or slabs 1 and 2 by temporarily welding or sticking them together at various points, enables them to be easily handled, prevents one slipping on the other and also tends to prevent one being rolled out beyond the other. By thus maintaining them in proper relation to each other the process may be carried out successfully and expeditiously and waste of material due to scrapped edges is avoided.

One of the rolls, as for example, the roll 7, is provided with a recess 9, which may be plain or in the form of a letter or trade mark or other significant mark, so that one side of the composite plate is provided with a distinctive mark which enables the hard and soft sides of the completed plate to be easily distinguished. Of course, other forms of marking may be employed if desired.

The foregoing method provides a composite steel plate, which is particularly useful for plows and other analogous devices in which one surface of the steel must be hard and wear-resisting and the body tenacious and not subject to being easily broken. By this method, the composite plate may be readily and inexpensively manufactured with a minimum waste of material.

If desired, one or more high and one or more low carbon plates may be placed together alternately, their edges welded, or the plates otherwise held together, as shown in Fig. 8, and the plates then heated and passed through rolls as described. When placing the plates in a furnace, care should be taken to have a low carbon plate on top so as to protect the high carbon plates.

It is to be understood that various changes may be made in the exact method employed for making the plate and that any suitable apparatus may be used, that herein shown being merely for purposes of illustration.

I claim:

1. The method of making composite steel plates, which consists in placing on the bottom of a heating furnace a pile of steel plates or slabs of different carbon content, with a low carbon plate on the top of the pile, bringing said plates or slabs to a welding temperature, and then subjecting them to pressure to unite them into an integral composite plate.

2. The method of making composite steel plates, which consists in placing in a heating furnace a pile of steel plates or slabs of different carbon content, with a high carbon steel plate or slab resting on the bottom of the furnace and a low carbon steel plate or slab on the top of the pile, bringing said plates or slabs to a welding temperature, and then subjecting the same to pressure to unite them into an integral composite plate.

3. The method of making composite steel plates, which consists in assembling a plurality of steel plates or slabs of varying carbon content, welding the same together at points or spots, placing the same on the bottom of a heating furnace with a low carbon plate on top, bringing them to a welding temperature, and then subjecting them to pressure to unite them into an integral composite plate or slab.

In testimony whereof I have hereunto set my hand.

WARREN WORTHINGTON.

Witnesses:
    EDW. L. HENDRICKSON,
    MARGARET GRIFFITHS.